US008464854B2

(12) United States Patent
Tameike

(10) Patent No.: US 8,464,854 B2
(45) Date of Patent: Jun. 18, 2013

(54) MONEY HANDLING SYSTEM AND MONEY HANDLING METHOD

(75) Inventor: Tetsuya Tameike, Toyonaka (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 99 days.

(21) Appl. No.: 13/093,900

(22) Filed: Apr. 26, 2011

(65) Prior Publication Data

US 2012/0273323 A1    Nov. 1, 2012

(51) Int. Cl.
    *G06M 3/08*      (2006.01)
    *G07D 11/00*    (2006.01)
    *G07F 19/00*    (2006.01)

(52) U.S. Cl.
    USPC ............................. 194/215; 235/379

(58) Field of Classification Search
    USPC .............. 194/215, 216, 217, 353; 235/6, 375, 235/379, 380, 382, 382.5; 209/534; 700/90, 700/215, 225; 705/64, 73, 75, 30, 35, 39; 902/8, 902/22, 24, 41
    See application file for complete search history.

(56) References Cited

U.S. PATENT DOCUMENTS

2004/0083149 A1    4/2004   Jones
2006/0283685 A1*   12/2006   Cousin ........................... 194/217

FOREIGN PATENT DOCUMENTS

JP           7-66459         7/1995
WO     WO 2009/019410 A1    2/2009

OTHER PUBLICATIONS

English Translation of Japanese Patent Publication No. JP-7-66459-B2 (24 Pages).*
European Search Report dated Feb. 8, 2012 (8 pages).

* cited by examiner

*Primary Examiner* — Mark Beauchaine
(74) *Attorney, Agent, or Firm* — Renner, Kenner, Greive, Bobak, Taylor & Weber

(57) ABSTRACT

A money handling system includes a plurality of money handling machines that are configured to recognize and count money. A management device is provided to assign first and second recognition information for respectively recognizing a transaction of money and for recognizing a group that is created by dividing the money for one transaction. In addition, each money handling machine receives the second recognition information, counts the money of the group corresponding to the second recognition information, and associates the count result with the second recognition information, whereupon the associated count result and second recognition information is transmitted to a management device. The management device manages the count result for each group based on the association between the first recognition information and the second recognition information, as well as on the count results and second recognition information, respectively received from the plurality of money handling machines.

19 Claims, 6 Drawing Sheets

| TRANSACTION ID | AAAA | | INPUTTED TOTAL AMOUNT OF MONEY | 103373 | | | |
|---|---|---|---|---|---|---|---|
| | GROUP ID | | | | | | TOTAL |
| | 001 | | 002 | | 003 | | |
| DENOMINATION | NUMBER | TOTAL AMOUNT | NUMBER | TOTAL AMOUNT | NUMBER | TOTAL AMOUNT | NUMBER | TOTAL AMOUNT |
| 1 | 0 | 0 | 0 | 0 | 53 | 53 | 53 | 53 |
| 5 | 0 | 0 | 0 | 0 | 60 | 300 | 60 | 300 |
| 10 | 0 | 0 | 102 | 1020 | 0 | 0 | 102 | 1020 |
| 20 | 0 | 0 | 200 | 4000 | 0 | 0 | 200 | 4000 |
| 50 | 0 | 0 | 300 | 15000 | 0 | 0 | 300 | 15000 |
| 100 | 830 | 83000 | 0 | 0 | 0 | 0 | 830 | 83000 |
| TOTAL | 830 | 83000 | 602 | 20020 | 113 | 353 | 1545 | 103373 |

(205)

| THE SOURCE OF TRANSMISSION | GROUP ID | COUNT RESULT |
|---|---|---|
| MONEY HANDLING DEVICE 10A | 001 | COUNT RESULT A |
| MONEY HANDLING DEVICE 10B | 006 | COUNT RESULT B |
| MONEY HANDLING DEVICE 10C | 003 | COUNT RESULT C |
| MONEY HANDLING DEVICE 10D | 002 | COUNT RESULT D |
| MONEY HANDLING DEVICE 10E | 004 | COUNT RESULT E |

TRANSACTION ID  AAAA          INPUTTED TOTAL AMOUNT OF MONEY  103373

| GROUP ID | COUNT RESULT |
|---|---|
| 001 | 83000 |
| 001 | 20020 |
| 001 | 353 |
| TOTALIZATION RESULT | 103373 |

FIG.6

TRANSACTION ID: AAAA    INPUTTED TOTAL AMOUNT OF MONEY: 103373

| DENOMINATION | GROUP ID 001 NUMBER | 001 TOTAL AMOUNT | 002 NUMBER | 002 TOTAL AMOUNT | 003 NUMBER | 003 TOTAL AMOUNT | TOTAL NUMBER | TOTAL TOTAL AMOUNT |
|---|---|---|---|---|---|---|---|---|
| 1 | 0 | 0 | 0 | 0 | 53 | 53 | 53 | 53 |
| 5 | 0 | 0 | 0 | 0 | 60 | 300 | 60 | 300 |
| 10 | 0 | 0 | 102 | 1020 | 0 | 0 | 102 | 1020 |
| 20 | 0 | 0 | 200 | 4000 | 0 | 0 | 200 | 4000 |
| 50 | 0 | 0 | 300 | 15000 | 0 | 0 | 300 | 15000 |
| 100 | 830 | 83000 | 0 | 0 | 0 | 0 | 830 | 83000 |
| TOTAL | 830 | 83000 | 602 | 20020 | 113 | 353 | 1545 | 103373 |

FIG.7

MONEY HANDLING SYSTEM AND MONEY HANDLING METHOD

FIELD OF THE INVENTION

The present invention relates to a money handling system and a money handling method, respectively adapted for counting a great amount of money with high efficiency.

BACKGROUND OF THE INVENTION

In a financial institution, such as a bank or the like, the great amount of money that is carried from a plurality of client companies is made up by using a plurality of money handling machines. In this case, one operator is arranged for one money handling machine, and each operator serves to make up the money for one transaction. For instance, the term "money for one transaction" means the money carried from one client company. However, in the case in which the money for one transaction should be handled in a considerably great amount, it is not efficient for one operator to make up such a great amount of money by using a single money handling machine.

Therefore, a money counting machine has been proposed, which is adapted for dividing the great amount of money for one transaction into a plurality of groups of money, and then separately handling such divided groups of money, by using the plurality of money handling machines (e.g., JP7-66459B). However, in this prior art money counting machine, the divided money was managed by using the same management number. Therefore, the number and/or amount, for each denomination, of the divided money could not be grasped accurately. Besides, the degree of progress in the process provided to each group of the divided money could not be confirmed adequately.

SUMMARY OF THE INVENTION

The money handling system related to one aspect of the present invention includes: the plurality of money handling machines, each money handling machine being configured to recognize and count the money, and a management device configured to assign first recognition information for recognizing the transaction to the money for one transaction, assign second recognition information for recognizing a group to each of a plurality of groups provided by dividing the money for one transaction, associate the first recognition information with the second recognition information, and manage such associated first and second recognition information, wherein each money handling machine receives the second recognition information inputted thereto, counts the money of each group corresponding to the second recognition information, associates this count result with the second recognition information and transmits such associated count result and second information to the management device, and the management device manages the count result, for each group, based on the association between the first recognition information and the second recognition information as well as on the count results and second recognition information, respectively received from the plurality of money handling machines.

The money handling system related to another aspect of the present invention includes: the plurality of money handling machines, each money handling machine being configured to recognize and count the money; and the management device configured to assign the first recognition information for recognizing the transaction to the money for one transaction, wherein each money handling machine assigns the second recognition information for recognizing the group to any one of the plurality of groups provided by dividing the money for one transaction, with input of the first recognition information, and then transmits the second recognition information associated with the first recognition information, and a count result obtained by counting the money of each group to which the second recognition information is assigned, to the management device, and wherein the management device associates the first recognition information, the second recognition information and the count results, respectively received from the plurality of money handling machines, with one another, and then manages such associated first recognition information, second recognition information and count results.

The money handling method related to one aspect of the present invention uses the plurality of money handling machines, each money handling machine being configured to recognize and count the money, and the management device configured to manage the count result of each money handling machine, and includes: assigning the first recognition information for recognizing the transaction to the money for one transaction, by using the management device; assigning the second recognition information for recognizing the group to each of the plurality of groups provided by dividing the money for one transaction, by using the management device; associating the first recognition information with the second recognition information, and then managing such associated first and second recognition information; inputting the second recognition information to each money handling machine; a step of recognizing and counting the money of each group, by using each corresponding money handling machine to which the second recognition information is inputted; associating the count result obtained by each money handling machine with the second recognition information, and then transmitting such associated count result and second recognition information to the management device; and managing the count result, for each group, based on the association between the first recognition information and the second recognition information as well as on the count results and the second information, respectively received from the plurality of money handling machines, by using the management device.

BRIEF DESCRIPTION OF THE DRAWINGS

FIG. 5 is a diagram showing one example of reception data of the management device;

FIG. 6 is a diagram showing one example of a display on a display unit of the management device;

FIG. 7 is a diagram showing another example of the display on the display unit of the management device;

DETAILED DESCRIPTION OF THE INVENTION

Hereinafter, one embodiment of the present invention will be described, with reference to the drawings.

Figure 1:
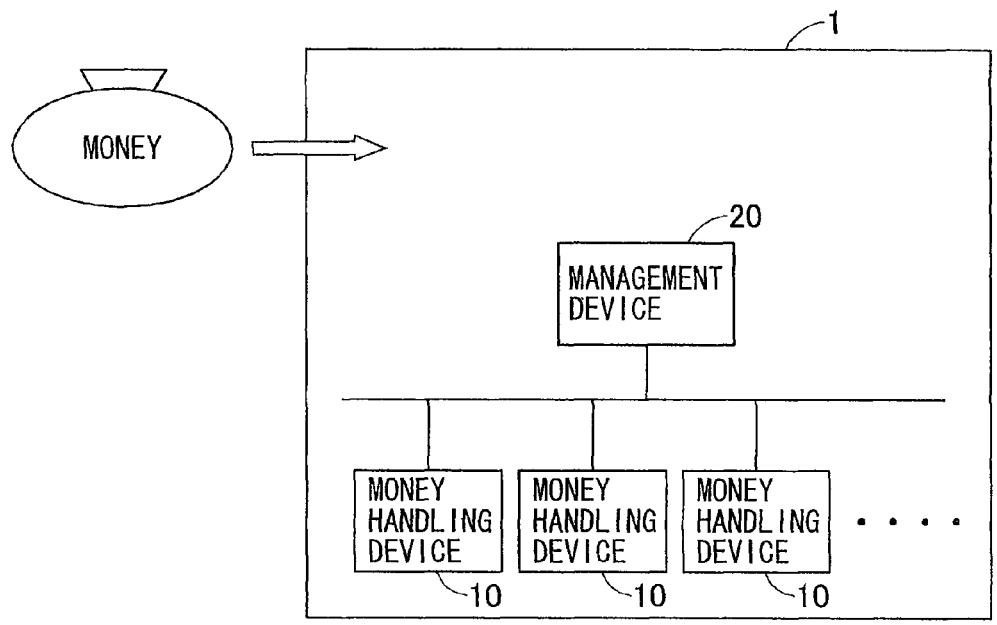
FIG. 1 is a diagram schematically showing one exemplary construction of the money handling system according to one embodiment of the present invention.

FIG. 1 schematically illustrates the construction of the money handling system according to this embodiment of the present invention. As shown in FIG. 1, the money handling system is installed in a cash handling center 1, and includes the plurality of money handling machines 10, each adapted for recognizing and counting the money, and the management device 20 connected, by communication, with the plurality of money handling machines 10, via a LAN or the like, and adapted for obtaining and managing the count result of each money handling machine 10.

Figure 2:
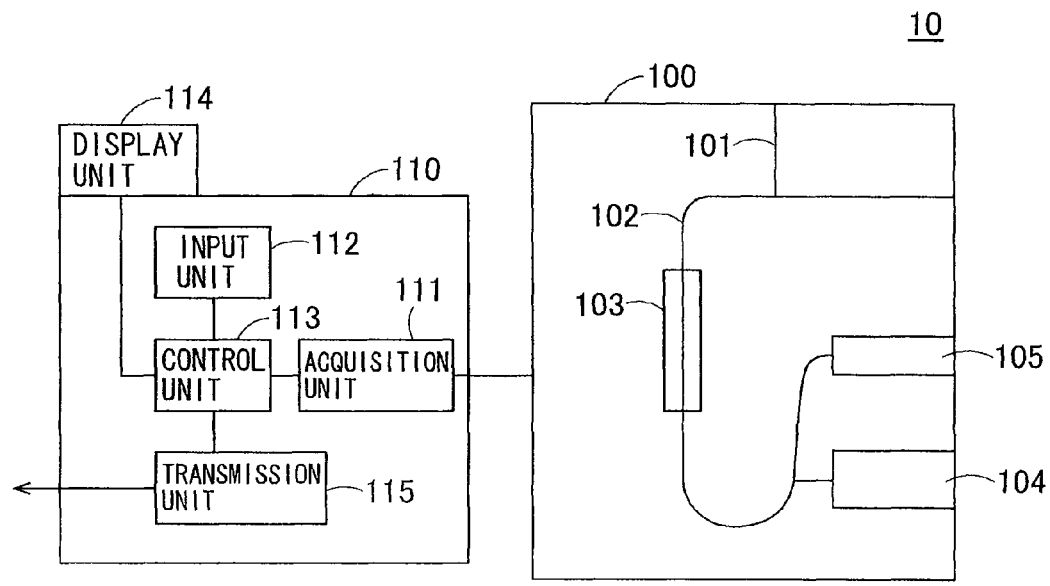
FIG. 2 is a block diagram showing one exemplary construction of the money handling machine.

The block diagram of FIG. 2 shows one exemplary construction of one money handling machine 10. In this example, the money handling machine 10 includes a money counting device 100 configured to recognize and count the money, and an information processing device 110 configured to transmit the count result on the money counted by the money counting device 100 to the management device 20. For instance, the information processing device 110 is composed of a personal computer or the like.

The money counting device 100 includes a receiving unit 101 configured to take the banknotes, one by one, into the device 100, and a transport unit 102 configured to transport the banknotes taken in the device, one by one. More specifically, the receiving unit 101 can serve to receive the banknotes respectively deposited thereto by the operator, and then take the banknotes, one by one, into the money counting device 100. The transport unit 102 is provided for transporting the banknotes toward a stacking unit 104 or reject unit 105. For instance, the transport unit 102 is composed of a combination of belt transport mechanisms. In this case, each belt transport mechanism is composed of a pair of or three or more rollers and a rubber belt fitted around the respective rollers.

To the transport unit 102, a recognition unit 103 is provided for recognizing and counting the money taken in the device 100 by the receiving unit 101. For instance, this recognition unit 103 is composed of a line sensor. The transport unit 102 is bifurcated into two transport paths, at a point on the downstream side of the recognition unit 103. One transport path of the bifurcated transport unit 102 is connected to the stacking unit 104, while the other transport path thereof is connected to the reject unit 105.

While the money counting device 100 shown in FIG. 2 has been explained as one provided for recognizing and counting the banknotes, this money counting device 100 may also have a function for recognizing and counting the coins.

The information processing device 110 is connected with the money counting device 100, and includes an acquisition unit 111 configured to obtain the count result on the money counted by the recognition unit 103 of the money counting device 100. The count result includes the total amount of the money and the number of money for each denomination thereof.

Further, the information processing device 110 includes an input unit 112 provided for inputting each group ID that is assigned to each corresponding group of the money counted by the money counting device 100. For instance, this input unit 112 is a keyboard. It is noted that the group ID will be described later.

A control unit 113 can serve to control one display unit 114 to display thereon each count result obtained by the acquisition unit 111 from the money counting device 100 and each group ID inputted via the input unit 112. For instance, the display unit 114 is a liquid crystal display device. Further, the control unit 113 can serve to control a transmission unit 115 to transmit each count result obtained by the acquisition unit 111 from the money counting device 100 and each group ID inputted via the input unit 112, to the management device 20.

In the money handling machine 10, the money counting device 100 may be integrated with the information processing device 110.

Figure 3:
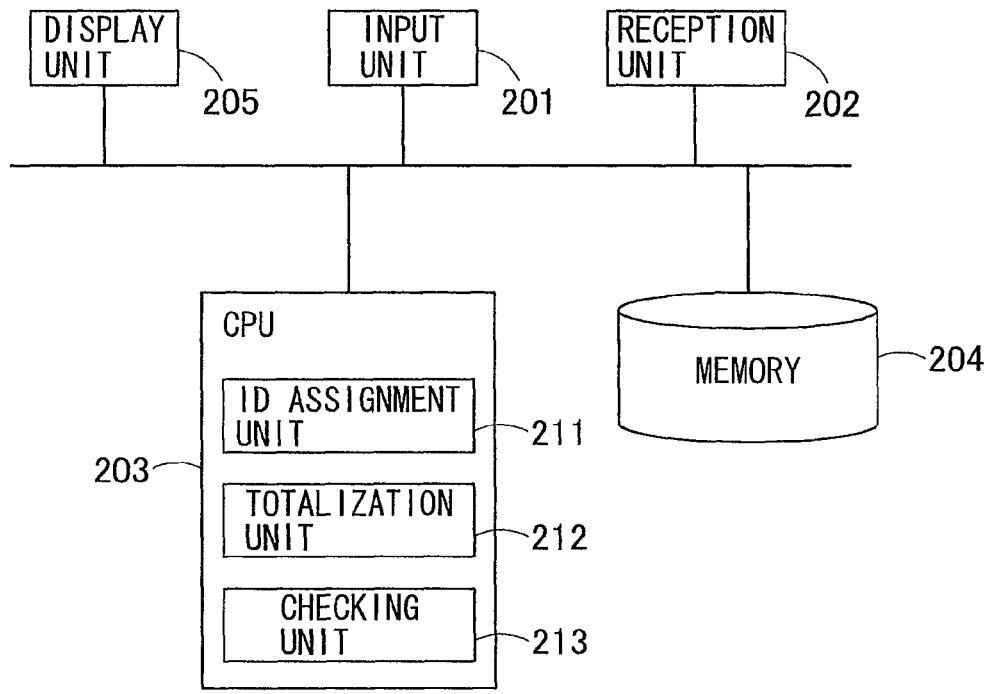
FIG. 3 is a block diagram showing one exemplary construction of the management device.

The block diagram of FIG. 3 shows one exemplary construction of the management device 20. This management device 20 is composed of the personal computer or the like, and includes an input unit 201, a reception unit 202, a CPU 203 and a memory 204. For instance, the input unit 201 is a keyboard or mouse provided for allowing the operator to input various information therefrom. The reception unit 202 is provided for receiving each count result and/or group ID transmitted from the money handling machine 10.

The CPU 203 can serve to execute a money handling program stored in the memory 204 or storage means (not shown), in order to achieve each function of an ID assignment unit 211, a totalization unit 212 and a checking unit 213.

The ID assignment unit 211 is adapted for assigning or providing a transaction ID (or first recognition information) for recognizing the transaction to the money for one transaction. In the cash handling center 1 shown in FIG. 1, the great amount of money is carried from, for example, a plurality of bank branches and retail stores. As used herein, the "money for one transaction" refers to the money carried from one bank branch or money carried from one retail store.

Further, the ID assignment unit 211 can serve to assign the group ID (or second recognition information) for recognizing each of the plurality of groups provided by dividing the money for one transaction. Namely, since the money for one transaction consists of the great amount of money, it is necessary to once divide such money into the plurality of groups, and then recognize and count such divided money by using the plurality of money handling machines 10.

Then, each transaction ID and each group ID respectively assigned by the ID assignment unit 211 are stored in the memory 204, while being associated with each other.

Figure 4:
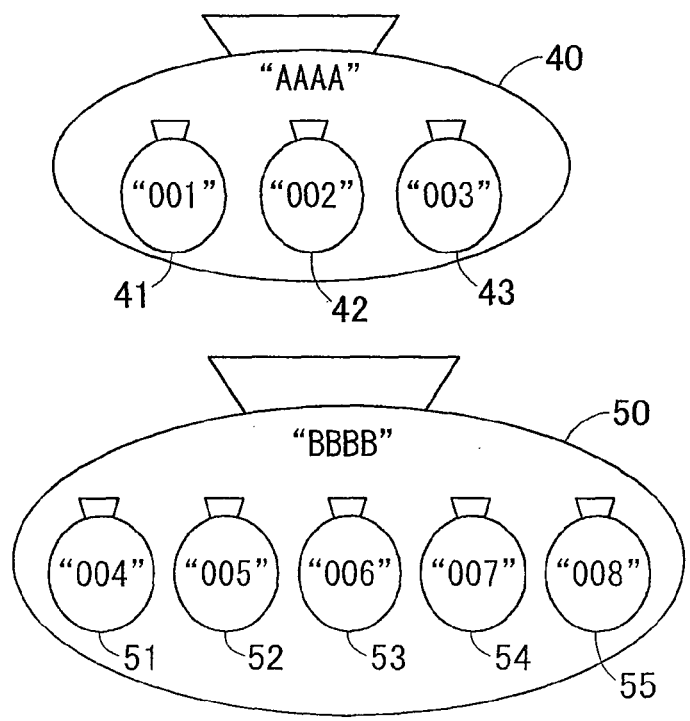
FIG. 4 is a block diagram illustrating one example in which the money for one transaction is divided.

For instance, as shown in FIG. 4, the money 40 for one transaction is divided into three groups 41, 42, 43, and the money 50 for another transaction is divided into five groups 51, 52, 53, 54, 55. In this case, the ID assignment unit 211 assigns one transaction ID, e.g., "AAAA", to the money 40 for one transaction, and further assigns the group IDs, e.g., "001", "002", "003", to the three groups 41, 42, 43, respectively. In addition, the ID assignment unit 211 assigns another transaction ID, e.g., "BBBB", to the money 50 for another transaction, and further assigns the group IDs, e.g., "004", "005", "006", "007", "008", to the five groups 51, 52, 53, 54, 55, respectively.

In this case, the group IDs "001", "002", "003" are stored in the memory 204, while being respectively associated with the transaction ID "AAAA". In addition, the group IDs "004", "005", "006", "007", "008" are stored in the memory 204, while being respectively associated with the transaction ID "BBBB".

In this case, each group ID is assigned or provided as one of consecutive numbers. However, any other suitable group ID may be employed, provided that this group ID can allow each corresponding group to be clearly recognized.

The totalization unit 212 is provided for totalizing the count results, based on the count results and group IDs respectively received from the plurality of money handling machines 10, as well as on the association between the transaction IDs and group IDs respectively stored in the memory 204.

Now, one example of a totalization process performed by the totalization unit 212, in the case in which the ID assignment unit 211 assigns the transaction IDs and group IDs, as respectively shown in FIG. 4, will be described. For instance, the management device 20 receives the count results and group IDs, as respectively shown in FIG. 5, from five money handling machine 10A to 10E, after the assignment of such transaction IDs and group IDs. More specifically, the management device 20 receives the group ID 001 and count result A from the money handling machine 10A. Similarly, the management device 20 receives the group ID 006 and count result B from the money handling machine 10B. Further, the management device 20 receives the group ID 003 and count result C from the money handling machine 10C. Similarly, the management device 20 receives the group ID 002 and count result D from the money handling machine 10D. Additionally, the management device 20 receives the group ID 004 and count result E from the money handling machine 10E.

In this case, the totalization unit 212 determines that the group IDs 001, 002, 003 respectively correspond to the same transaction, based on the association between each transaction ID and the group IDs stored in the memory 204. Then, the totalization unit 212 totalizes the count result A, count result D and count result C. Namely, the result of this totalization corresponds to the count result of the money 40 for one transaction, to which the transaction ID "AAAA" is assigned.

In this way, the management device 20 can assign one transaction ID to the money for one transaction, as well as can assign one group ID to each of the plurality of groups provided by dividing the money for one transaction. Thus, this management device 20 can manage the count result of the money, not only for each transaction, but also for each group.

In some cases, the total amount of the money 40 for one transaction has been calculated, in the banker branch, retail store or the like, before the money 40 is carried into the cash handling center 1. In this case, the total amount of money that has been calculated in advance is inputted by the operator via the input unit 201. Then, the checking unit 213 can compare the total amount of money inputted via the input unit 201 with the totalization result obtained by the totalization unit 212. If the result of this comparison checked by the checking unit 213 shows that the total amount of money inputted via the input unit 201 does not correspond to the totalization result obtained by the totalization unit 212, the management device 20 may operate an alarm unit (not shown) to generate an alarm sound.

In a first display mode, as shown in FIG. 6, the management device 20 can operate the display unit 205 to display thereon the group ID and count result, for each group. Further, the management device 20 can operate the display unit 205 to display thereon the totalization result obtained by the totalization unit 212 and the total amount of money inputted via the input unit 201.

Alternatively or additionally, in a second display mode, as shown in FIG. 7, the management device 20 may operate the display unit 205 to display thereon the number of money, for each denomination thereof, as each count result. Further, the display of the total amount of money (i.e., the first display mode shown in FIG. 6) and the display of the number of money for each denomination thereof (i.e., the second display mode shown in FIG. 7) may be optionally switched on the display unit 205.

Figure 8:
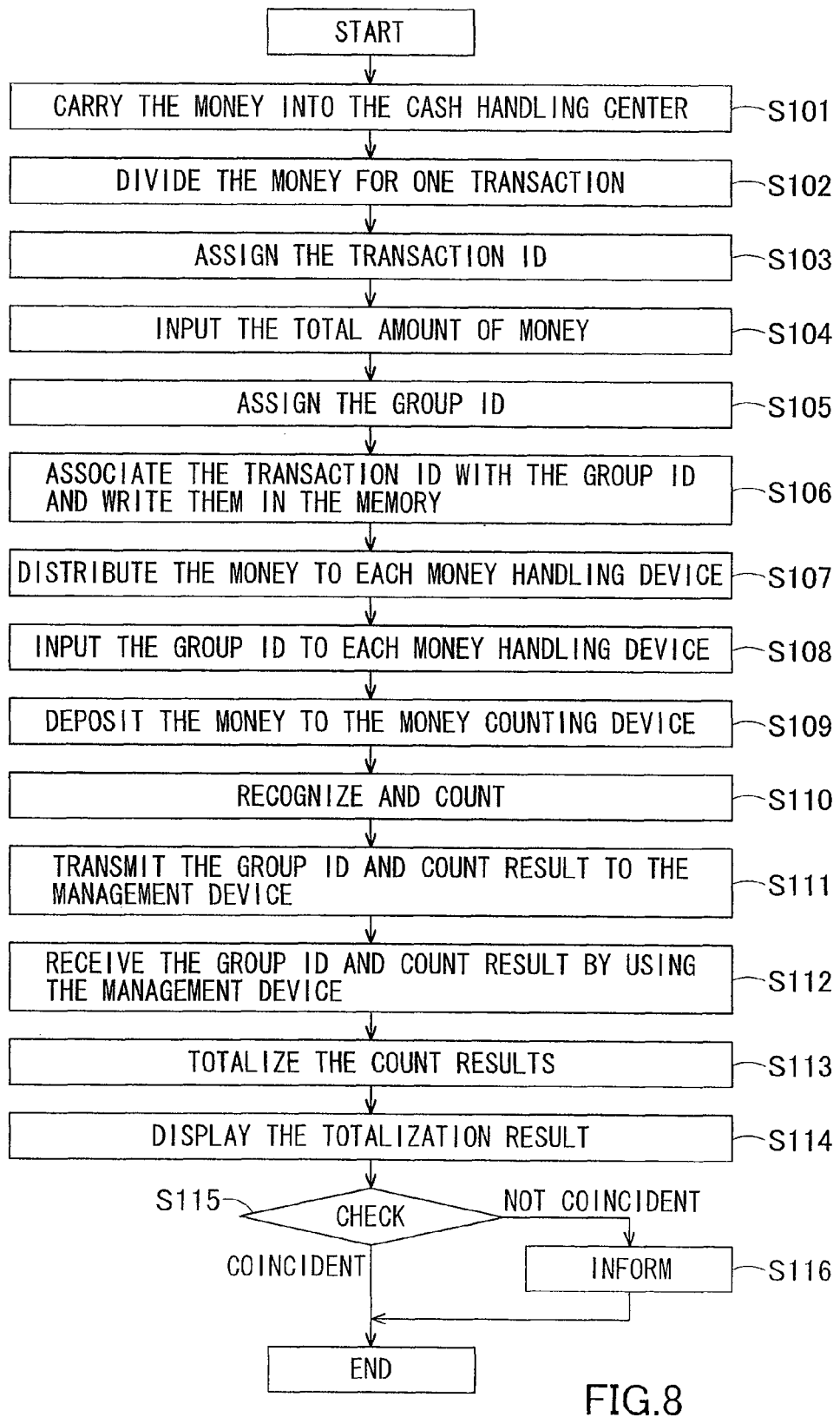
FIG. 8 is a flow chart illustrating the money handling method according to the same embodiment.

Now, referring to the flow chart of FIG. 8, the money handling method in the cash handling center 1 including the money handling system as described above will be discussed.

(Step S101)
First, the money is carried into the cash handling center 1.
(Step S102)
Then, the money for one transaction is divided into the plurality of groups. For instance, the money is divided on the basis of the denominations and/or currency thereof. In this case, assume that the total amount of money for one transaction is calculated, in advance, in the bank branch, retail store or the like.
(Step S103)
Subsequently, the ID assignment unit 211 of the management device 20 assigns the transaction ID to the money for one transaction carried in the cash handling center 1 in the step S101.
(Step S104)
Thereafter, the total amount of the money for one transaction is inputted via the input unit 201.
(Step S105)
Then, the ID assignment unit 211 of the management device 20 assigns the group ID to each of the plurality of groups divided in the step S102. In this case, the management device 20 may issue or output a journal on which the assigned group ID is printed, for each group.
(Step S106)
Then, the transaction ID and each group ID are written in the memory 204 of the management device 20, while being associated with each other. At this time, the total amount of money inputted in the step S104 is also stored in the memory 204, together with the transaction ID and group IDs.
(Step S107)
Thereafter, the money of each group is distributed to each of the plurality of money handling machines 10. For instance, the money of each group is distributed to each different money handling machine 10.
(Step S108)
Subsequently, each group ID is inputted to each corresponding money handling machine 10. More specifically, each group ID is inputted via the input unit 112 of the information processing device 110. It is noted that the process in each of the steps S108 to S111 is performed in each of the plurality of money handling machines 10.
(Step S109)
Thereafter, the money of each group corresponding to each group ID inputted in the step S108 is deposited or inserted into the receiving unit 101 of the money counting device 100.
(Step S110)
Then, the money counting device 100 recognizes and counts the money deposited in the step S109.
(Step S111)
Subsequently, the information processing device 100 transmits the count results respectively obtained in the step S110 and the group IDs respectively inputted in the step S108, to the management device 20. Each count result includes the total amount of money and the number of money for each denomination thereof.
(Step S112)
Then, the management device 20 receives the respective group IDs and count results from the plurality of money handling machines 10 (or information processing devices 100).
(Step S113)
Subsequently, the totalization unit 212 of the management device 20 totalizes the count results, based on each group ID and each count result, respectively received in the step S112, as well as on the transaction ID and each group ID, respectively stored in the memory 204. More specifically, the management device 20 extracts the plurality of group IDs, respectively associated with the same transaction ID, and then totalizes the count results, respectively transmitted from the money handling machines 10, based on the extracted group IDs.
(Step S114)

Thereafter, the group ID and count result are displayed on the display unit 205, for each group. In addition, the totalization result calculated in the step S113 and the total amount of money inputted in the step S104 are also displayed on the display unit 205.
(Step S115)

Then, the checking unit 213 compares the totalization result calculated in the step S113 with the total amount of money inputted in the step S104.
(Step S116)

If the totalization result calculated in the step S113 is not coincident with the total amount of money inputted in the step S104 in the comparison of the above Step S115, the management device 20 informs the operator of this checking result.

In this way, according to the money handling system related to this embodiment, the great amount of money for one transaction can be divided and then counted by the plurality of money handling machines 10, thereby substantially enhancing the efficiency of the counting process for the money. In addition, the management device 20 can assign the group ID to each of the plurality of groups provided by dividing the money for one transaction, thereby to manage the count result (i.e., the number of money for each denomination thereof or total amount of money) for each group. Further, this management device 20 can serve to manage the degree of progress in the counting process, for each group (i.e., this management device 20 can check whether or not the counting process is performed in each money handling machine 10), based on the group ID received, together with the count result, from each money handling machine 10.

In the above embodiment, upon assigning the group ID to the money of one group, the management device 20 may also assign a handling machine ID (or third recognition information) of the money handling machine 10 that performs the counting process for the money of this group. In this case, each handling machine ID is stored in the memory 204, while being associated with each corresponding group ID. With such assignment of the handling machine ID, the management device 20 can serve to check, for each money handling device 10, the presence or absence of any group of money for which the counting process is not yet completed.

Further, in the above embodiment, the management device 20 can serve to manage the money of each group waiting for the process in the corresponding money handling machine 10, money of each group that is being processed and money of each group that is already processed, thereby controlling the load imposed on each money handling machine 10 during the process. Further, the management device 20 can assign each handling machine ID, in view of the load on each money handling machine 10 during the process. More specifically, this handling machine ID is preferably assigned such that the counting process can be performed in the money handling machine 10 that is not handling the money or handling fewer money. With such assignment of each handling machine ID, the plurality of money handling machines 10 can be respectively used with high efficiency, thereby achieving a more effective counting process for the great amount of money.

Rather than assigning the handling machine ID, the management device 20 may assign further information (or operator ID) for recognizing the operator arranged for each money handling machine 10, to the money of each group. This operator ID is also stored in the memory 204, while being associated with the group ID. With the assignment of such operator IDs, the management device 20 can serve to check, for each operator, the presence or absence of any group of money for which the counting process is not yet completed. Therefore, with such assignment of the operator IDs, the plurality of money handling machines 10 can be respectively used with higher efficiency, thereby achieving the counting process for a greater amount of money.

Further, a reading unit for reading each group ID printed on the journal outputted or issued from the management device 20 may be provided as a part of the input unit 112 of the money handling machine 10. More specifically, the management device 20 may print and output a bar-code for indicating each group ID, while a bar-code reader for reading the bar-code may be provided to each money handling machine 10. With this configuration, the time and labor required for inputting each group ID to each corresponding money handling machine 10 can be substantially saved.

The money counting devices 100 of the respective money handling machines 10 may respectively have the same configuration, or otherwise may be configured, differently from one another, in order to handle different currency.
(First Modification of the Money Handling Machine 10)

Figure 9:
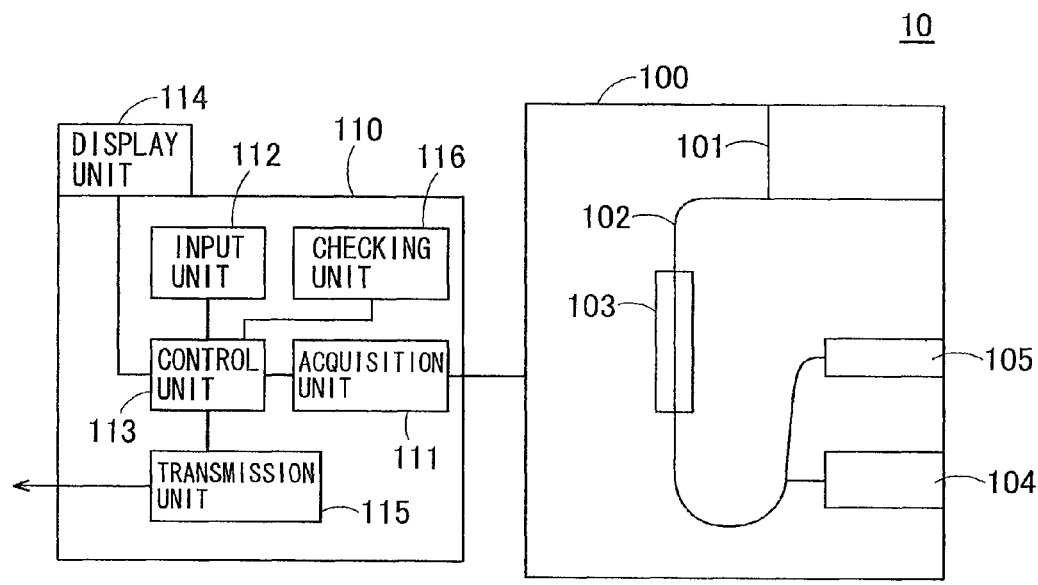
FIG. 9 is a block diagram showing a construction of a money handling machine according to a first modification.

In each money handling machine 10, as shown in FIG. 9, a checking unit 116 configured to compare the total amount of money of one group inputted via the input unit 112 with the count result of the money counting device 100 may be provided to the information processing device 110.

In some cases, before the money is carried in the cash handling center 1, the money is already divided into the groups, based on the denominations and/or currency thereof, and then the total amount of money of each group and the number of the money for each denomination thereof are respectively counted. In this case, it is preferred that the total amount of money of one group and/or number of the money for each denomination thereof, respectively counted in advance, are inputted from the input unit 112, and is then compared with the count result of the money counting device 100 by the checking unit 116.
(Second Modification of the Money Handling Machine 10)

Figure 10:
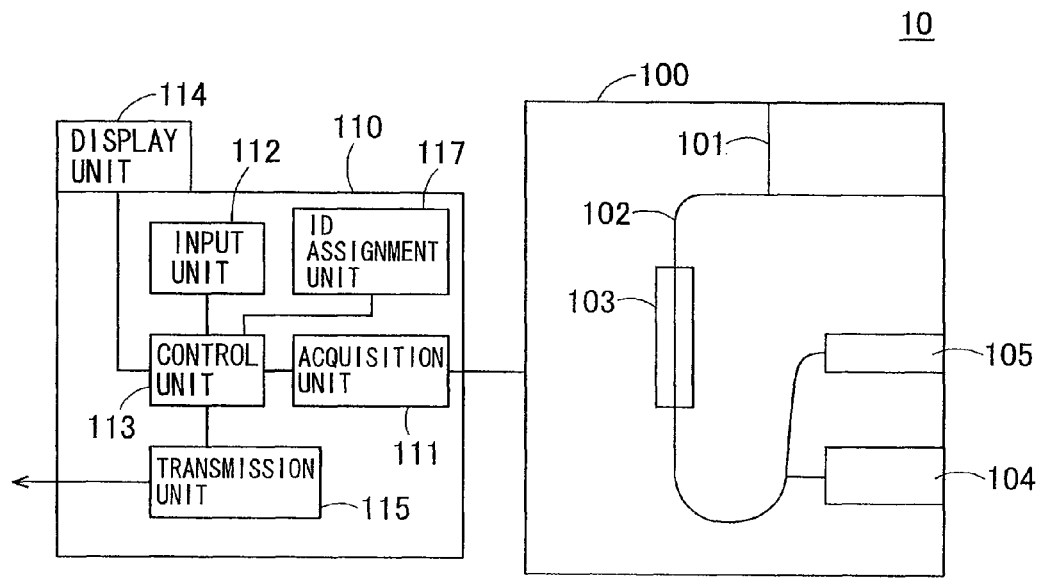
FIG. 10 is a block diagram showing a construction of a money handling machine according to a second modification.

Alternatively, in each money handling machine 10, as shown in FIG. 10, an ID assignment unit 117 configured to assign the group ID to the money of one group counted by the money counting device 100 may be provided to the information processing device 110.

In the money handling system including such money handling machines 10, the ID assignment unit 211 of the management device 20 first assigns the transaction ID to the money for one transaction. Then, the money for one transaction is divided into the plurality of groups, and thereafter the money of each group is transferred to any one of the plurality of money handling machines 10.

In this case, when one transaction ID for the transaction corresponding to the money of a certain group to be counted is inputted to the input unit 112 of a certain money handling machine 10, the ID assignment unit 117 assigns one group ID to the money of this group. For instance, this group ID is composed of one handling machine ID of the corresponding money handling machine 10 and one of sequential numbers. Then, the money handling machine 10 associates each assigned group ID with each corresponding transaction ID inputted from the input unit 112, and transmits such associated group ID and transaction ID to the management device 20.

When receiving the group IDs and transaction IDs respectively transmitted from the plurality of money handling machines 10, the management device 20 further associates the groups IDs with the transaction IDs, and then controls the memory 204 to store therein such associated IDs.

Thereafter, each money handling machine 10 transmits the count result on the money of one group and the group ID assigned to this money, to the management device 20. Thus, similar to the above embodiment, the totalization unit 212 of the management device 20 can totalize the count results, based on the count results and group IDs, respectively received from the plurality of money handling machines 10, as well as on the association between the transaction IDs and the group IDs respectively stored in the memory 204.

In this manner, also in the case in which each money handling machine 10 serves to assign the group ID, the management device 20 can manage the count result for each group. Further, in this case, the management device 20 can compare the totalization result obtained by the totalization unit 212 with the total amount of money for one transaction that is calculated in advance.

Further, each money handling machine 10 may transmit the group ID assigned by the ID assignment unit 117, the transaction ID inputted from the input unit 112 and the count result of the money to which the group ID is assigned, collectively, to the management device 20.

In addition, each money handling machine 10 may make an inquiry to the management device 20 about any unused group ID, in order to obtain such an unused group ID from the management device 20 and then assign it to the money of one group.

Alternatively, both of the checking unit 116 and ID assignment unit 117 may be provided to the information processing device 110 of each money handling machine 10.

It should be understood that the present invention is not limited to the above embodiments, and that each component disclosed herein can be implemented, with various modifications and alterations, without departing from the gist of this invention. Further, it should be construed that proper combinations of any suitable components disclosed herein can constitute various inventions that may fall within the scope of this invention. For instance, several components may be removed from all of the components disclosed herein. In addition, several components respectively described and shown in the above different embodiments may be suitably combined with one another.

What is claimed is:

1. A money handling system comprising:
   a plurality of money handling machines, each money handling machine being configured to recognize and count money, and
   a management device configured to assign first recognition information for recognizing a transaction to the money for one transaction, assign second recognition information for recognizing a group to each of a plurality of groups provided by dividing the money for one transaction, associate the first recognition information with the second recognition information, and manage such associated first and second recognition information,
   wherein each money handling machine receives the second recognition information inputted thereto, counts the money of each group corresponding to the second recognition information, associates this count result with the second recognition information and transmits such associated count result and second information to the management device, and
   the management device manages the count result, for each group, based on the association between the first recognition information and the second recognition information as well as on the count results and second recognition information, respectively received from the plurality of money handling machines.

2. The money handling system according to claim 1,
   wherein information on the total amount of money for one transaction to which the first recognition information is assigned is inputted to the management device,
   the management device totalizes the count results respectively received from the plurality of money handling machines, based on the first recognition information and the second recognition information, and
   the management device compares the totalization result with the information on the total amount of money.

3. The money handling system according to claim 2,
   wherein the management device includes a display unit configured to display thereon the second recognition information and the count result, for each group, as well as display thereon the totalization result and the information on the total amount of money.

4. The money handling system according to claim 3,
   wherein each money handling machine transmits the count result including the number of money for each denomination thereof and total amount of the money of one group to the management device, and
   the display unit is capable of switching a first display mode in which the total amount of money is displayed as the count result, and a second display mode in which the number of money for each denomination thereof as the count result.

5. The money handling system according to claim 1,
   wherein the management device assigns third recognition information for recognizing each operator in charge of handling the money or money handling machine operated by the operator, to each group, and
   the management device associates the first recognition information, second recognition information and third recognition information, with one another, and manages such associated first, second and third recognition information.

6. The money handling system according to claim 1,
   wherein the total amount of money of one group corresponding to the second recognition information is inputted to each money handling machine, and
   the money handling machine compares the count result of the money of this group with the inputted total amount of money.

7. The money handling system according to claim 1,
   wherein each of the plurality of money handling machines is configured to recognize and count the money mutually different, in the denomination or currency thereof.

8. A money handling system comprising:
   a plurality of money handling machines, each money handling machine being configured to recognize and count money; and
   a management device configured to assign first recognition information for recognizing a transaction to the money for one transaction,
   wherein each money handling machine assigns second recognition information for recognizing a group to any one of a plurality of groups provided by dividing the money for one transaction, with input of the first recognition information, and transmits the second recognition information associated with the first recognition information, and a count result obtained by counting the money of each group to which the second recognition information is assigned, to the management device, and
   the management device associates the first recognition information, the second recognition information and the count results, respectively received from the plurality of money handling machines, with one another, and manages such associated first recognition information, second recognition information and count results.

9. The money handling system according to claim 8,
wherein, information on the total amount of money for one transaction to which the first recognition information is assigned is inputted to the management device,
the management device totalizes the count results respectively associated with the first recognition information, and
the management device compares the totalization result with the information on the total amount of money.

10. The money handling system according to claim 8,
wherein each money handling machine creates the second recognition information by using a handling machine ID assigned to this money handling machine and one of sequential numbers.

11. The money handling system according to claim 9,
wherein the management device includes a display unit configured to display thereon the second recognition information and the count result, for each group, as well as display thereon the totalization result and the information on the total amount of money.

12. The money handling system according to claim 11,
wherein each money handling machine transmits the count result including the number of money for each denomination thereof and total amount of the money of one group to the management device, and
the display unit is capable of switching a first display mode in which the total amount of money is displayed as the count result, and a second display mode in which the number of money for each denomination thereof as the count result.

13. The money handling system according to claim 8,
wherein the total amount of money of one group, to which the second recognition information is assigned, is inputted to each money handling machine, and
the money handling machine compares the count result of the money of this group with the inputted total amount of money.

14. The money handling system according to claim 8,
wherein each of the plurality of money handling machines is configured to recognize and count the money mutually different, in the denomination or currency thereof.

15. A money handling method using a plurality of money handling machines, each money handling machine being configured to recognize and count money, and a management device configured to manage a count result of each money handling machine, the method comprising:
assigning first recognition information for recognizing a transaction to the money for one transaction, by using the management device;
assigning second recognition information for recognizing a group to each of a plurality of groups provided by dividing the money for one transaction, by using the management device;
associating the first recognition information with the second recognition information, and then managing such associated first and second recognition information;
inputting the second recognition information to each money handling machine;
recognizing and counting the money of each group, by using each corresponding money handling machine to which the second recognition information is inputted;
associating the count result obtained by each money handling machine with the second recognition information, and then transmitting such associated count result and second recognition information to the management device; and
managing the count result, for each group, based on the association between the first recognition information and the second recognition information as well as on the count results and the second information, respectively received from the plurality of money handling machines, by using the management device.

16. The money handling method according to claim 15, further comprising:
inputting information on the total amount of money for one transaction to which the first recognition information is assigned, to the management device; and
totalizing the count results, respectively received from the plurality of money handling machines, based on the first recognition information and the second recognition information, and then comparing the result of this totalization with the information on the total amount of money, by using the management device.

17. The money handling method according to claim 15, further comprising:
assigning third recognition information for recognizing each operator in charge of handling the money or money handling machine operated by the operator, to each group, by using the management device,
wherein the third recognition information is managed, while being associated with the first recognition information and the second recognition information.

18. The money handling method according to claim 15, further comprising:
inputting the total amount of money of one group corresponding to the second recognition information, to each money handling machine; and
comparing the count result with the total amount of money.

19. The money handling method according to claim 15,
wherein the money of the plurality of groups is mutually different, in the denomination or currency thereof.

* * * * *